United States Patent
McCarthy, IV et al.

(10) Patent No.: US 6,990,432 B1
(45) Date of Patent: *Jan. 24, 2006

(54) APPARATUS AND METHOD FOR PERFORMING GAS TURBINE ADJUSTMENT

(75) Inventors: John Patrick McCarthy, IV, Hoboken, NJ (US); Eamon Patrick Gleeson, Atlanta, GA (US); Andrew Joseph Travaly, Ballston Spa, NY (US); William Francis Lopes, Groton, MA (US)

(73) Assignee: General Electric Company, Schenectady, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 10/407,882

(22) Filed: Apr. 4, 2003

(51) Int. Cl.
*G06F 11/30* (2006.01)

(52) U.S. Cl. .................. 702/184; 702/182; 702/188; 370/252; 370/241.1; 340/500; 105/61.5; 700/287; 700/286

(58) Field of Classification Search ............ 702/58, 702/182–188; 370/252, 241.1; 324/464; 340/531, 534, 500; 701/35; 105/61.5; 700/287, 700/286
See application file for complete search history.

(56) References Cited

U.S. PATENT DOCUMENTS

| | | | |
|---|---|---|---|
| 3,750,465 A * | 8/1973 | Howell et al. ............. 73/117.3 |
| 4,060,716 A | 11/1977 | Pekrul et al. | |
| 4,426,641 A * | 1/1984 | Kurihara et al. ............ 340/683 |
| 5,255,208 A | 10/1993 | Thakore et al. | |
| 5,552,711 A | 9/1996 | Deegan et al. | |
| 5,661,627 A * | 8/1997 | Liebetruth et al. .......... 361/115 |
| 5,754,446 A * | 5/1998 | Fisher et al. ................ 700/287 |
| 6,157,310 A | 12/2000 | Milne et al. | |
| 6,285,932 B1 * | 9/2001 | de Bellefeuille et al. ..... 701/33 |
| 6,721,631 B2 * | 4/2004 | Shimizu et al. ............ 700/287 |
| 6,738,697 B2 * | 5/2004 | Breed ......................... 701/29 |

OTHER PUBLICATIONS

Corbett, 'Remote Monitoring and Control of Advanced Gas Turbines', CCEJ, Apr. 2001, pp. 1-7.*
Daley et al., 'Adaptive Gas Turbine Control Using a Singular System Approach', Mar. 1994, IEEE Article, pp. 687-691.*

* cited by examiner

*Primary Examiner*—Marc S. Hoff
*Assistant Examiner*—Elias Desta
(74) *Attorney, Agent, or Firm*—Armstrong Teasdale LLP

(57) ABSTRACT

A system for performing gas turbine system adjustments includes a server installed on a computer, the server coupled to a gas turbine engine control system and configured to transmit data indicative of an operating state of a gas turbine engine, and a client application including a database, the client application configured to receive the gas turbine operating state data transmitted by the server, and enable a user to analyze the gas turbine operating data to determine a desired gas turbine operating state, wherein the desired operating state is communicated to the gas turbine engine control system to facilitate adjusting at least one gas turbine combustion control system operating parameter based on the desired gas turbine operating state.

20 Claims, 4 Drawing Sheets

APPARATUS AND METHOD FOR PERFORMING GAS TURBINE ADJUSTMENT

BACKGROUND OF THE INVENTION

This invention relates generally to a computer network-based system and more particularly to a system and method for providing assistance to gas turbine system operators on a variety of issues.

For business entities having numerous employees located in multiple divisions worldwide, getting help on a timely basis for gas turbine combustion dynamics or gas turbine systems related issues is a major challenge. Locating a person within an organization to resolve an issue is sometimes difficult in such business entities. Another challenge involves getting an opportunity to discuss the problem with a qualified individual. During the process of locating the appropriate individual and finding a mutually convenient time to discuss the issue, there is normally a significant delay due to exchange of messages and time lag between phone calls from experts.

For example, when a gas turbine engine operator desires to contact a gas turbine systems expert to resolve an issue, the operator typically uses one of the traditional methods such as telephone, filling out the forms identifying a problem, undertaking research via the Internet on World Wide Web, or voice mails to identify the problem. These methods are generally cumbersome, impersonal and time consuming. Voice mail systems are not only complex to follow but may also be unresponsive to the gas turbine operator's needs. Overall, the traditional methods can be very frustrating and may not necessarily facilitate resolving the gas turbine operator's issues.

BRIEF DESCRIPTION OF THE INVENTION

In one aspect, a system for performing gas turbine system adjustments is provided. The system includes a server installed on a computer, the server coupled to a gas turbine engine control system and configured to transmit data indicative of an operating state of a gas turbine engine. The system also includes a client application including a database, the client application configured to receive the gas turbine operating state data transmitted by the server, and enable a user to analyze the gas turbine operating data to determine a desired gas turbine operating state, wherein the desired operating state is communicated to the gas turbine engine control system to facilitate adjusting at least one gas turbine combustion control system operating parameter based on the desired gas turbine operating state.

In another aspect, a method for performing gas turbine system adjustments is provided. The method includes transmitting data indicative of a gas turbine operating state using a server installed on a computer, the server coupled to a gas turbine engine control system. The method also includes receiving the data indicative of the gas turbine operating state at a client application, the client application including a database, analyzing the data indicative of the gas turbine operating, determining a desired gas turbine operating state using the analyzed data, and communicating the desired operating state to a gas turbine engine control system to facilitate adjusting at least one gas turbine combustion control system operating parameter based on the desired gas turbine operating state.

DETAILED DESCRIPTION OF THE INVENTION

While the methods and apparatus are herein described in the context of a gas turbine engine used in an industrial environment, it is contemplated that the herein described method and apparatus may find utility in other combustion turbine systems applications including, but not limited to, turbines installed in aircraft. In addition, the principles and teachings set forth herein are applicable to gas turbine engines using a variety of combustible fuels such as, but not limited to, natural gas, gasoline, kerosene, diesel fuel, and jet fuel. The description hereinbelow is therefore set forth only by way of illustration rather than limitation.

Figure 1:
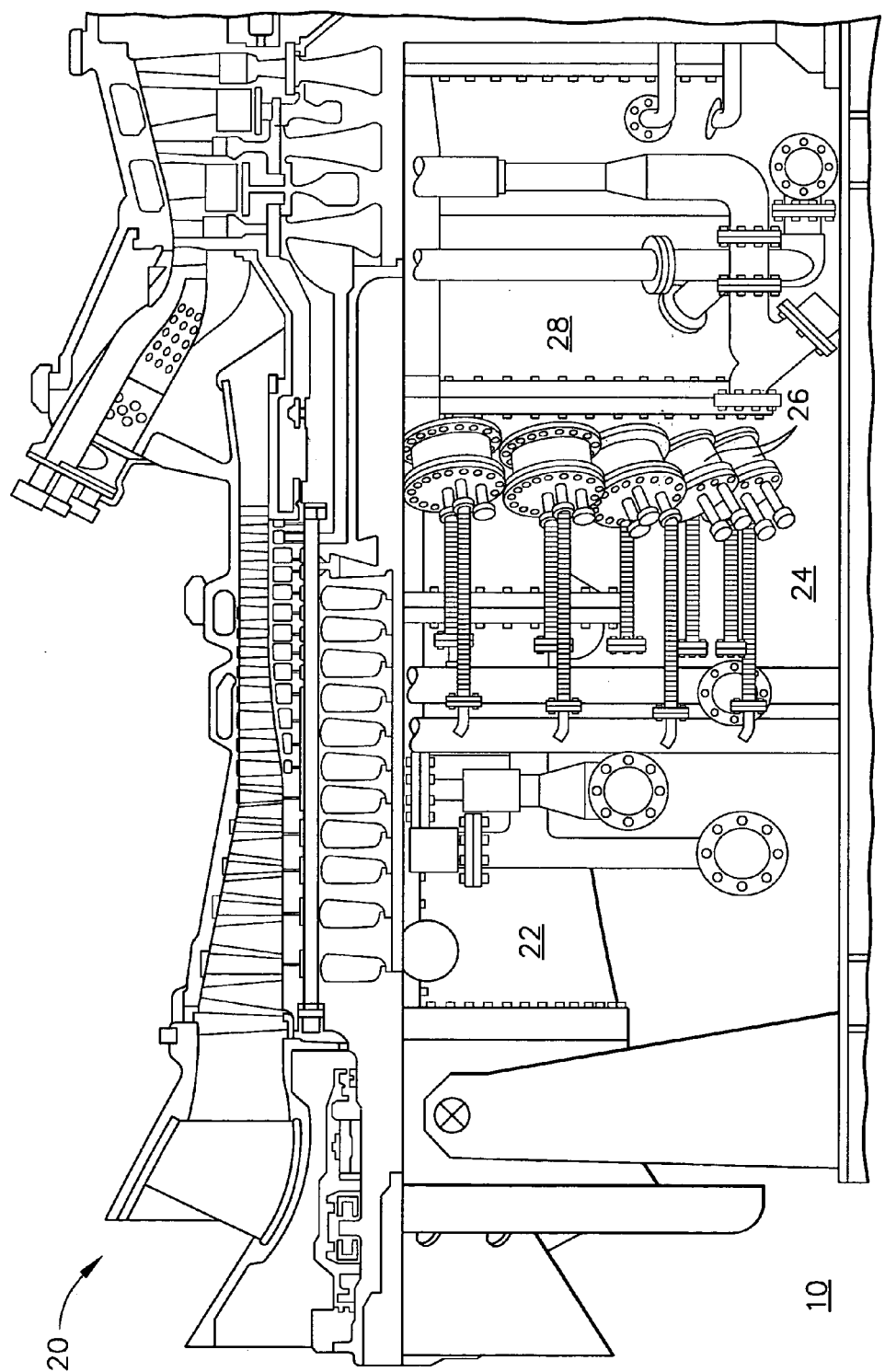
FIG. 1 is a side cutaway view of a gas turbine system that includes a gas turbine.

FIG. 1 is a side cutaway view of a gas turbine system 10 that includes a gas turbine 20. Gas turbine 20 includes a compressor section 22, a combustor section 24 including a plurality of combustor cans 26, and a turbine section 28 coupled to compressor section 22 using a shaft (not shown).

In operation, ambient air is channeled into compressor section 22 where the ambient air is compressed to a pressure greater than the ambient air. The compressed air is then channeled into combustor section 24 where the compressed air and a fuel are combined to produce a relatively high-pressure, high-velocity gas. Turbine section 28 extracts energy from the high-pressure, high-velocity gas discharged from combustor section 24. The combusted fuel mixture is used to produce energy, such as, for example, electrical, heat, and/or mechanical energy. In one embodiment, the combusted fuel mixture produces electrical energy measured in kilowatt hours (kWh). However, the present invention is not limited to the production of electrical energy and encompasses other forms of energy, such as, mechanical work and heat. Gas turbine system 10 is typically controlled, via various control parameters, from an automated and/or electronic control system (not shown) that is attached to gas turbine system 10.

Figure 2:
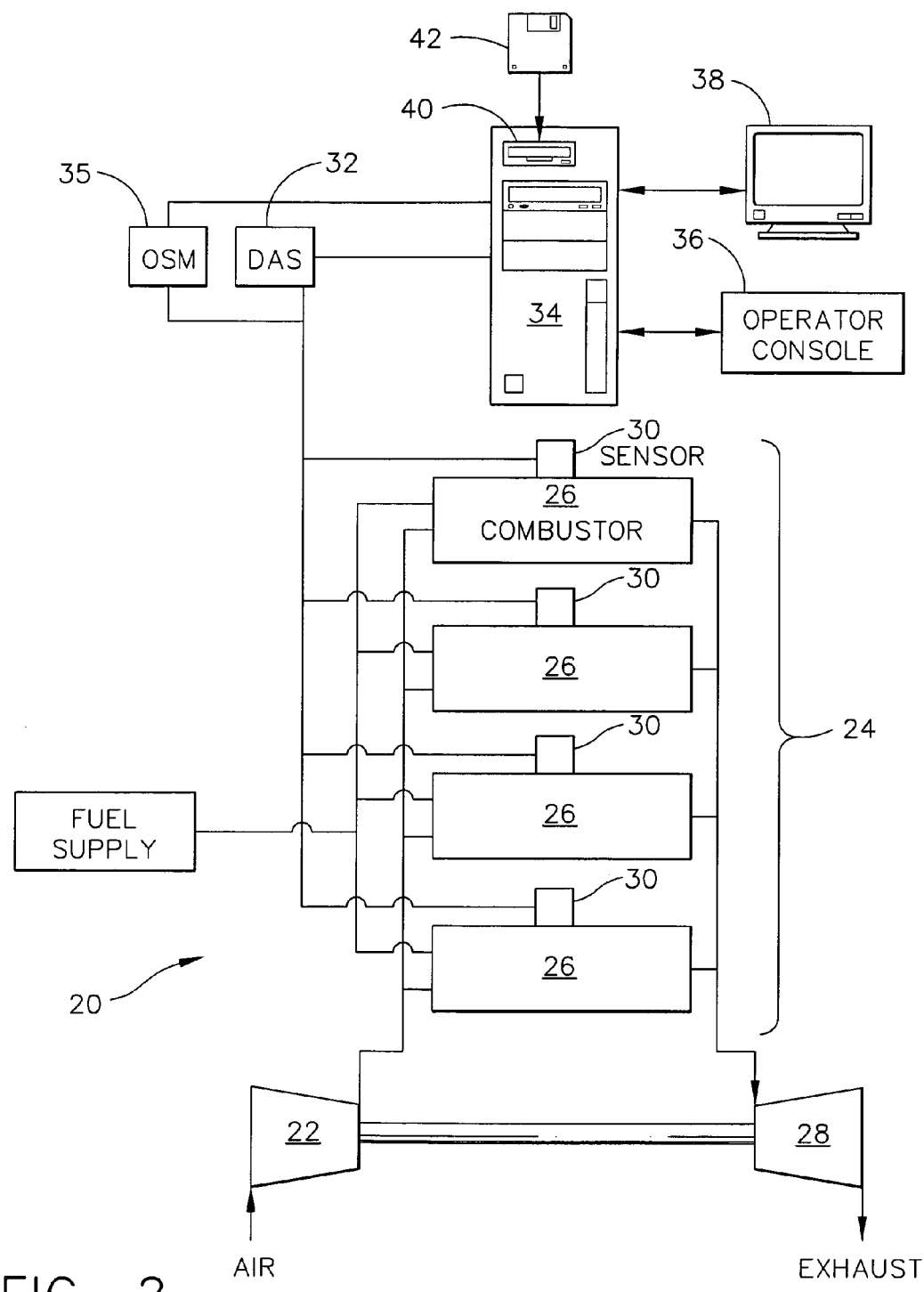
FIG. 2 is a schematic illustration the gas turbine system shown in FIG. 1.

FIG. 2 is a simplified schematic illustration of gas turbine system 10 shown in FIG. 1. Gas turbine system 10 also includes a plurality of sensors 30 electrically coupled to gas turbine 20. In the exemplary embodiment, at least one sensor 30 is mechanically coupled to each combustor can 26. A combustion dynamics monitor (CDM) 32, i.e. a data acquisition system, samples analog data from sensors 30 and converts the analog data to digital signals for subsequent processing. A computer 34 receives the sampled and digitized sensor data from at least one of DAS 32 and an onboard system monitor (OSM) 35, and performs high-speed data analysis. In the exemplary embodiment, computer 34 is the gas turbine control system and is configure to receive a plurality of signal inputs from gas turbine 20. Although only four combustor cans 26 are shown, it should be realized that gas turbine engine 20 can include more or less than four combustor cans 26, for example, in one exemplary embodiment, gas turbine engine 20 includes twenty four combustor cans 26.

Computer 34 receives commands from an operator via a keyboard 36. An associated monitor 38 such as, but not limited to, a liquid crystal display (LCD) and a cathode ray tube, allows the operator to observe data received from computer 34. The operator supplied commands and parameters are used by computer 34 to provide control signals and information to CDM 32 and OSM 35.

In one embodiment, computer 34 includes a device 40, for example, a floppy disk drive, CD-ROM drive, DVD drive, magnetic optical disk (MOD) device, or any other digital device including a network connecting device such as an Ethernet device for reading instructions and/or data from a computer-readable medium 42, such as a floppy disk, a CD-ROM, a DVD or an other digital source such as a network or the Internet, as well as yet to be developed digital means. In another embodiment, computer 34 executes instructions stored in firmware (not shown). Computer 34 is programmed to perform functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein. Additionally, although the herein described methods and apparatus are described in an industrial setting, it is contemplated that the benefits of the invention accrue to non-industrial systems such as those systems typically employed in a transportation setting such as, for example, but not limited to, aircraft.

Figure 3:
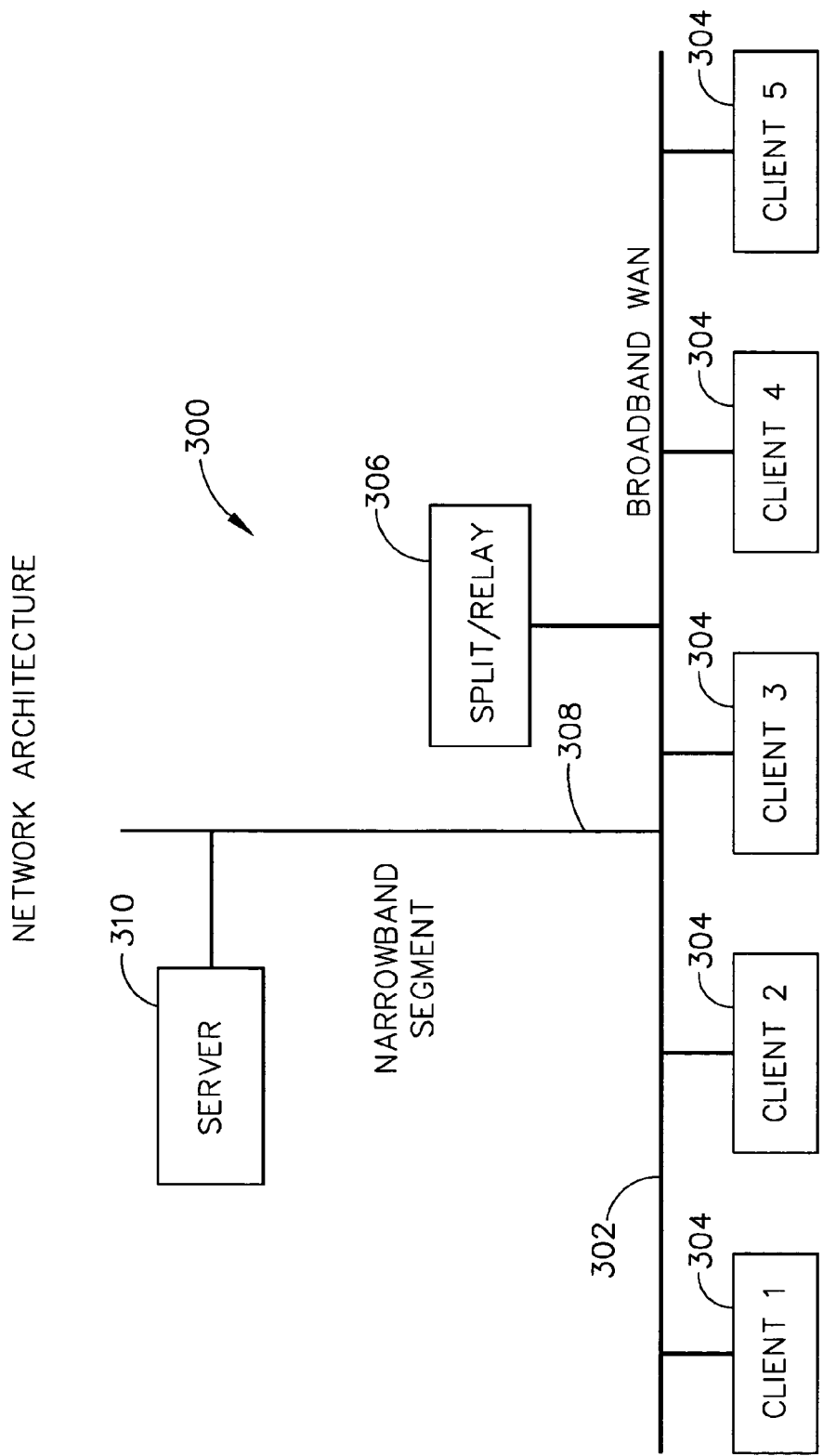
FIG. 3 is a schematic illustration of an exemplary network architecture that may be used with the combustion dynamics monitor (CDM) and the onboard system monitor (OSM) shown in FIG. 2.

FIG. 3 is a schematic illustration of an exemplary network architecture 300 that may be used with combustion dynamics monitor (CDM) 32 and onboard system monitor (OSM) 35 (shown in FIG. 2). The network includes a broadband segment 302 communicatively coupled to at least one client application 304. In the exemplary embodiment, broadband segment 302 is a private intranet for communicating gas turbine control system tuning information between remote turbine sites and tuning engineers located at a home office or other remote turbine sites. In an alternative embodiment, broadband segment 302 is the Internet. A Split/Relay device 306 that includes a microprocessor, and a narrowband network segment 308 are also communicatively coupled to broadband segment 302. A server 310 is coupled to narrowband segment 308. In the exemplary embodiment, narrowband segment 308 is a remote access server and server 310 is onboard system monitor (OSM) 35 and/or combustion dynamics monitor (CDM) 32.

In operation, OSM 35 and CDM 32 monitor turbine operating parameters locally. For tuning OSM 35 and CDM 32, a dial-up connection is established with narrowband segment 308 from OSM 35 and CDM 32. In the exemplary embodiment, clients 304 are monitoring workstations located remotely from the turbine being tuned. At a remote location, a tuning engineer is able to monitor the gas turbine operation from a client 304 configured as a tuning workstation. The tuning engineer then communicates tuning instructions to a technician located at the turbine engine. Data received by OSM 35 and CDM 32 is transmitted through narrowband segment 308 as a stream of data. Split/Relay 306 receives the data stream into a buffer, splits the stream into data packets which may then be transmitted to a predetermined list of clients through broadband segment 302. In the exemplary embodiment, a User Datagram Protocol (UDP) protocol is used to transmit the data packets. Split/Relay 306 monitors it's input socket to listen for incoming traffic, when traffic from narrowband segment 308 arrives it is read into a buffer where it is read and then packetized for transmission to a list of clients. The packet is transmitted to each respective client output socket, wherein when the end of the client list is reached, Split/Relay 306 reinitializes the client list and waits for a next input data stream to arrive. In the exemplary embodiment, Split/Relay 306 inserts a source IP address to each data packet prior to transmitting the packet through broadband segment 302. Each client 304 may then read the source IP address in each data packet and discard any message that is not from a source from which client 304 is expecting communications.

Figure 4:
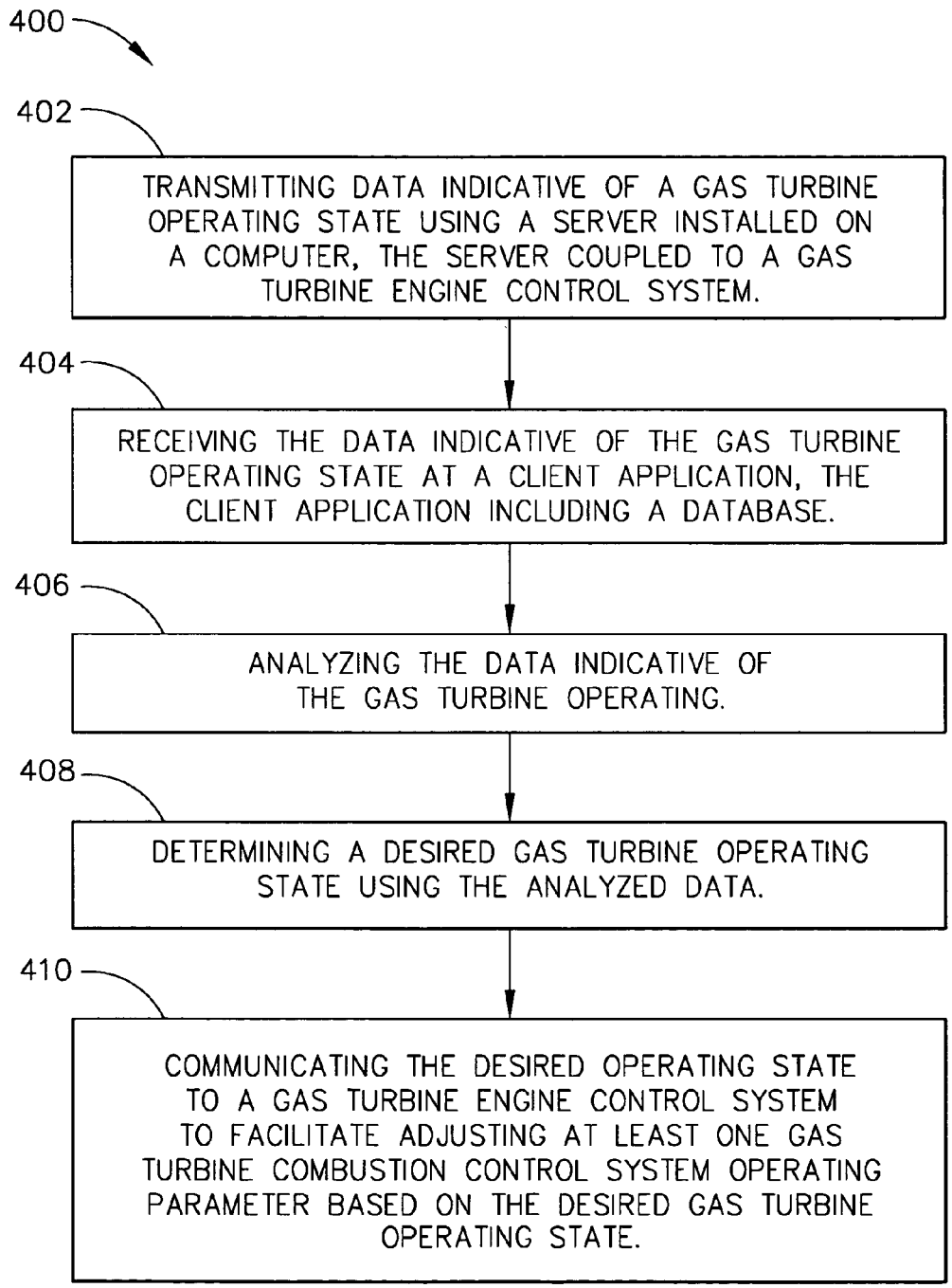
FIG. 4 is an exemplary method for monitoring the combustion dynamics of a gas turbine engine system.

FIG. 4 is a flow chart illustrating an exemplary method 400 for performing gas turbine system adjustments. Method 400 includes transmitting 402 data indicative of a gas turbine operating state using a server installed on a computer, wherein a server is coupled to a gas turbine engine control system, and receiving 404 such data at a client application, wherein the client application includes a database. Method 400 also includes analyzing 406 the data indicative of the gas turbine operating, determining 408 a desired gas turbine operating state using the analyzed data, and communicating 410 the desired operating state to a gas turbine engine control system to facilitate adjusting at least one gas turbine combustion control system operating parameter based on the desired gas turbine operating state.

In use, operating data such as, but not limited to, data indicative of combustion dynamic pressure, gas turbine inlet air temperature, gas turbine exhaust temperature, gas turbine load, and gas turbine emission data are collected by at least one of CDM 32 and OSM 35. The collected data is transmitted to client 304 via broadband segment 302 and narrowband network segment 308. In one embodiment, the collected data is transmitted using at least one of a telephone connections, a satellite, or an internet connection. A user, i.e. an expert, positioned at a remote location receives the operating data and analyzes the data based on a desired gas turbine operating state. For example, the user compares the received data to a known acceptable gas turbine operating state to determine whether any of the received gas turbine parameters are not within desired limits. In the exemplary embodiment, the data is analyzed by a combustion dynamics expert positioned at client application 304.

The expert then determines whether adjustments to the combustion control systems are desirable. In one embodiment, if the expert desires to adjust any of gas turbine system 10 operating parameters, the desired changes are communicated to a local operator via a telephone. In another embodiment, the desired changes are communicated directly to gas turbine control system 34. If the desired changes are communicated to an operator, the operator inputs the desired changes directly into gas turbine engine control system 34. If the desired changes are communicated directly to gas turbine control system 34, the inputs are validated at both gas turbine control system 34 and client application 304 prior to being sent to gas turbine 20.

In one embodiment, the inputs are validated by an operator positioned proximate gas turbine system 10 wherein the remote expert provides the on-site operator with desired changes over a telephone for example. The on-site operator verbally verifies the inputs prior to entering the desired changes into gas turbine engine control system 34. In another embodiment, the inputs are validated through the remote computer such as but not limited to client application 304. In one embodiment, client application 304 includes a software screen. Software screen a used herein describes software programmed to verify whether the input is reasonable and plausible based on known operating conditions. If the desired change input to client server 304 is not within an allowable window, an error indication is generated at least one of client application 304 and server 310. If the change is allowable, then the current value, a new value, and an input to be changed are transmitted to a confirmation window on client server 304 with an "OK/Cancel" selection. The remote expert or the on-site operator can then select OK or Cancel to verify the change.

After the inputs have been validated, the control adjustment signals are transmitted from client application 304 to gas turbine control system 34 and executed, i.e. the inputs are sent to gas turbine 20 to change at least one desired operating parameter. The operation of gas turbine 20 in the newly adjusted mode is observed and the process is repeated until the desired beneficial operating characteristics are achieved.

This application provides a method of performing combustion systems adjustments and corrections from a remote location, utilizing real time operating data such as, but not limited to, combustion pressure dynamics, temperatures, load, ambients and emissions data. Furthermore, a method of performing analysis at a remote location for the purpose of determining the desired adjustments is provided to facilitate providing a desired beneficial operating effect at the combustion turbine.

The above-described methods and apparatus provide a cost-effective and reliable means for monitoring and diagnosing combustion dynamics of a gas turbine engine. More specifically, the methods facilitate providing real time analysis and adjustments on gas turbine engines in a relatively short amount of time, thereby reducing gas turbine down time.

An exemplary method and apparatus for monitoring and diagnosing combustion dynamics of a gas turbine engine are described above in detail. The apparatus illustrated is not limited to the specific embodiments described herein, but, rather, components of each may be utilized independently and separately from other components described herein. For example, the methods described herein can also be used in combination with a variety of other equipment such as, but not limited to, diesel engines.

While the invention has been described in terms of various specific embodiments, those skilled in the art will recognize that the invention can be practiced with modification within the spirit and scope of the claims.

What is claimed is:

1. A system for performing gas turbine system adjustments, said system comprising:
   a server installed on a computer, said server coupled to a gas turbine engine control system and configured to transmit data indicative of an operating state of a gas turbine engine; and
   a client application comprising a database, said client application configured to:
      receive the gas turbine operating state data transmitted by said server; and
      enable a remote user to analyze the gas turbine operating data using the received gas turbine operating state data to determine a gas turbine operating state;
   receive commands from the remote user to adjust at least one gas turbine combustion control system operating parameter to operate the gas turbine system at a desired operating state.

2. A system in accordance with claim 1 wherein said client application is further configured to communicate the desired gas turbine operating state to said gas turbine control system using an operator.

3. A system in accordance with claim 1 wherein said server is further configured to transmit data received from a plurality of pressure sensors, wherein at least one pressure sensor is mounted to a combustor can.

4. A system in accordance with claim 1 wherein said server further configured to transmit data indicative of gas turbine engine combustion dynamics, said client application further configured to receive data indicative of the gas turbine engine combustion dynamics.

5. A system in accordance with claim 1 further comprising an interconnection between said server and said client application, said interconnection device comprising at least one of a phone line, an internet connection, and a satellite connection.

6. A system in accordance with claim 5 wherein said interconnection comprises a data network split/relay device configured to receive data communication packets from said interconnection.

7. A system in accordance with claim 6 wherein said data network split/relay device comprises:
   a network input socket;
   a buffer configured to receive data from the network through the network input socket; and
   a microprocessor programmed to read buffered input data and send output data to a predetermined list of clients.

8. A system in accordance with claim 1 wherein said engine control system is further configured to validate the desired operating state.

9. A system in accordance with claim 1 wherein to transmit data indicative of a gas turbine operating state said server is further configured to transmit data indicative of at least one of combustion dynamic pressure, gas turbine inlet air temperature, gas turbine exhaust temperature, gas turbine load, and gas turbine emission data.

10. A system in accordance with claim 1 wherein said gas turbine engine control system comprises at least one of a combustion dynamics monitor (CDM) and an onboard system monitor (OSM).

11. A method for performing gas turbine system adjustments, said method comprising:
   transmitting data indicative of an operating state of a gas turbine using a server installed on a computer, the server coupled to a gas turbine engine control system;
   receiving the data indicative of the operating state of the gas turbine at a client application, the client application including a database;
   analyzing the data indicative of the operating state of the gas turbine;
   determining the operating state of the gas turbine using the analyzed data; and
   communicating gas turbine system adjustments to the gas turbine engine control system to facilitate adjusting at least one gas turbine combustion control system operating parameter to operate the gas turbine system at a desired operating state.

12. A method in accordance with claim 11 wherein said communicating the desired operating state to a gas turbine engine control system further comprises communicating the desired gas turbine operating state to the gas turbine control system using an operator.

13. A method in accordance with claim 11 further comprising transmitting data received from a plurality of pressure sensors to the server, wherein at least one pressure sensor is mounted to a combustor can.

14. A method in accordance with claim 11 wherein said transmitting data indicative of a gas turbine operating state using a server installed on a computer further comprises transmitting data indicative of gas turbine engine combustion dynamics using the server, and receiving the data indicative of the gas turbine engine combustion dynamics using the client application.

15. A method in accordance with claim 11 further comprising coupling an interconnection between the server and the client application, the interconnection device comprising at least one of a phone line, an internet connection, and a satellite connection.

16. A method in accordance with claim 15 wherein said coupling an interconnection between the server and the client application further comprises coupling an interconnection including a data network split/relay device configured to receive data communication packets from the interconnection between the server and the client application.

17. A method in accordance with claim 16 further comprising coupling an interconnection including a data network split/relay device including a network input socket, a buffer configured to receive data from the network through the network input socket, and a microprocessor programmed to read buffered input data and send output data to a predetermined list of clients between the server and the client application.

18. A method in accordance with claim 11 further comprising validating the desired operating data using the engine control system.

19. A method in accordance with claim 11 wherein to transmitting data indicative of a gas turbine operating state further comprises transmitting data indicative of at least one of combustion dynamic pressure, gas turbine inlet air temperature, gas turbine exhaust temperature, gas turbine load, and gas turbine emission data.

20. A method in accordance with claim 11 wherein said transmitting data indicative of a gas turbine operating state using a server installed on a computer, the server coupled to a gas turbine engine control system further comprises transmitting data indicative of a gas turbine operating state using a server installed on a computer, the server coupled to a gas turbine engine control system, the gas turbine control system including at least one of a combustion dynamics monitor (CDM) and an onboard system monitor (OSM).

* * * * *